United States Patent [19]

Yamada et al.

[11] Patent Number: 5,699,749
[45] Date of Patent: Dec. 23, 1997

[54] EXHAUST SYSTEM, HULL, AND SPEED INDICATOR FOR WATERCRAFT

[75] Inventors: Hisato Yamada; Mitsuhisa Hirano; Yasukazu Kojima, all of Iwata, Japan

[73] Assignee: Yamaha Hatsudoki Kabushiki Kaisha, Iwata, Japan

[21] Appl. No.: 544,887

[22] Filed: Oct. 18, 1995

[30] Foreign Application Priority Data

Oct. 21, 1994 [JP] Japan .................... 6-256599

[51] Int. Cl.[6] ........................................ B63B 35/00
[52] U.S. Cl. .................... 114/270; 73/187; 440/89; 114/283
[58] Field of Search .................... 114/123, 283, 114/270, 343; 440/1, 2, 38, 42, 88, 89; 73/187, 861.74, 861.77, 861.88, 861.87

[56] References Cited

U.S. PATENT DOCUMENTS

| | | | |
|---|---|---|---|
| 4,694,770 | 9/1987 | Kitner et al. | 114/123 |
| 5,007,870 | 4/1991 | Okubo et al. | 440/89 |
| 5,050,517 | 9/1991 | Kobayashi | 114/123 |
| 5,244,425 | 9/1993 | Tasaki et al. | 440/38 |
| 5,369,360 | 11/1994 | Amyot . | |
| 5,433,635 | 7/1995 | Kobayashi | 440/38 |

FOREIGN PATENT DOCUMENTS 3598   1/1990   Japan .................... 114/270

*Primary Examiner*—Edwin L. Swinehart
*Attorney, Agent, or Firm*—Knobbe,Martens, Olson & Bear LLP

[57] ABSTRACT

A personal watercraft exhaust system, hull underplate, and speed sensor and sponson arrangement. The exhaust system for the engine provides a compact assembly that incorporates a pair of expansion chamber devices on opposite sides of the tunnel to provide a water-trap effect, effective silencing, and still clear storage compartments of the hull. The sponsons are configured so as to improve the buoyancy and provide stability upon leaning, and the underplate mounts a speed sensor to the rear of but below the jet propulsion unit discharge so as to provide a good speed signal and to protect the speed sensor.

27 Claims, 12 Drawing Sheets

EXHAUST SYSTEM, HULL, AND SPEED INDICATOR FOR WATERCRAFT

BACKGROUND OF THE INVENTION

This invention relates to an improved watercraft and particularly one of the personal type and more specifically to an improved exhaust system, hull, and speed indicator for such watercraft.

As is well known, the design and functioning of the exhaust system for watercraft present problems which are unique to this type of vehicle. Not the least of these problems is the provision of adequate silencing in a relatively small area and one in which heat generation should be minimized. Unlike land vehicles, where the exhaust system can be conveniently placed in an open position where it will be cooled by the air and wherein relatively long exhaust systems and numerous large tuning tube devices employed, such luxuries are not available with most watercraft. This is particularly true with respect to a growing segment of the market of so-called "personal type" watercraft.

This type of watercraft is relatively small and is designed to be operated by a rider who may be accompanied by one or a few riders. Frequently, the passengers sit in a straddle fashion on a seat in which several riders may be accommodated in a tandem fashion.

In order to assist in the silencing of the exhaust gases in such confined areas and to improve their silencing and the cooling, it is frequently the practice to introduce water from the engine cooling jacket into the exhaust gases before their discharge to the atmosphere. It is also common practice to discharge the exhaust gases in an area either contiguous to or below the water level surface in which the watercraft is operating. Although these expedients are useful in silencing the exhaust gases and handling the fluids, there is a danger that water may enter the engine through the exhaust system.

Therefore, in addition to providing silencing devices in the exhaust system, it is also a practice to incorporate a water trap system wherein water cannot enter the engine through the exhaust system. Frequently, these water trap devices are also employed as silencing devices. However, with the small type of personal watercraft, it is difficult to provide such exhaust systems and ensure against water protection.

It is, therefore, a principal object of this invention to provide an improved exhaust system for a watercraft.

It is a further object of this invention to provide an improved and compact exhaust system for a watercraft and particularly a watercraft of the so-called personal type.

These small personal-type watercraft normally have a riders' area that is generally open and which affords little if any storage space. It is desirable, however, to provide some protective storage space for articles of the occupants and for some safety equipment Therefore, it has been proposed to provide storage compartments which may be positioned beneath the riders' seats.

As previously noted, these seats frequently are of the straddle-tandem type. The provision of such storage compartments, therefore, still further limits the space available for the exhaust system components.

It is, therefore, a still further object of this invention to provide an improved exhaust system for a small watercraft of this type wherein the exhaust system and one or more storage compartments may be interposed to each other and yet located so that they will not interfere with each other.

These personal watercraft are normally quite sporting in nature. In fact, often the rider and passengers wear swimming suits when utilizing these vehicles. That is, the rider and passengers may expect to enter the body of water in which the watercraft is operating and reenter the watercraft from the body of water. Thus, these watercraft generally have relatively open passenger areas wherein the watercraft may be easily boarded from the rear and from the body of water in which the watercraft is floating.

In order to maintain optimum performance, it is desirable that the hull have as small a wetted area as possible. Because of the nature of the watercraft, the depth of the hull in the water can significantly vary, depending upon the number of passengers accommodated.

It has been, therefore, proposed to provide hull configurations that have relatively shallow draft and yet which have some degree of stability. However, the hull designs previously proposed have not been able to accommodate a large difference in the weight and number of operators and still maintain these results.

It is, therefore, a still further object of this invention to provide an improved hull arrangement for a watercraft, wherein stabilizing sponsons may be employed that will assist in maintaining stability during large maneuvering or when carrying a greater weight.

With this type of watercraft, it may also be desirable to afford the operator some instrumentation. A speedometer is a very desirable instrument for such watercraft because the speedometer may be utilized not only to check vehicle speed, but also to control trim and other factors in order to maintain optimum performance. Most types of speed indicators employed require some component that is in the water so as to provide a signal indicative of speed.

With the personal-type watercraft, it is frequently the practice to utilize a jet propulsion unit as the propulsion device, and these are mounted in a tunnel on the underside of the watercraft. Therefore, the hull does not really have large areas where speed sensors may be accommodated.

It is, therefore, a still further object of this invention to provide an improved and simplified arrangement for providing a speed indication for a watercraft of this type.

SUMMARY OF THE INVENTION

A first feature of this invention is adapted to be embodied in a watercraft that is comprised of a hull with an under-surface defining a tunnel at the rear end thereof. A propulsion device is positioned at least in part within the tunnel for propelling the watercraft. The hull further defines an engine compartment that contains an engine for driving the propulsion device. The engine has an exhaust system for discharging exhaust gases from the exhaust port thereof to the atmosphere. The exhaust system comprises first and second exhaust treatment devices that are positioned within the hull on opposite sides of the tunnel. Each of these exhaust treatment devices is comprised of an outer housing that defines at least one expansion chamber therein. An exhaust pipe extends from the engine on one side of the hull and opens into the first exhaust treatment device at a forward end thereof for delivering exhaust gases from the engine thereto. A generally inverted U-shaped transfer pipe extends over the tunnel from an inlet end at an upper portion of the first exhaust treatment device and at the aft end thereof. This U-shaped transfer pipe terminates in a discharge end in the upper portion of the second exhaust treatment device and at a point forwardly of the inlet end. An exhaust discharge pipe extends from the aft end of the second exhaust treatment device for discharging the exhaust gases to the atmosphere.

Another feature of the invention is adapted to be embodied in a hull arrangement for a small watercraft. The watercraft has a generally V-shaped bottom undersurface that terminates at its side edges and a pair of upwardly and outwardly extending generally curved portions that terminate in vertically upwardly extending sides of the hull. Affixed to these sides are a pair of sponsons with the sponsons forming downwardly extending portions that are spaced outwardly from the curved portion of the hull and which extend below it for engagement with the water upon leaning for offering additional stability and buoyancy to the hull.

Yet another feature of the invention is adapted to be embodied in a watercraft having a hull with an undersurface that defines a tunnel at the rear end thereof and in which a propulsion device is positioned. The lower end of this tunnel is closed in part by a closure plate that extends beneath the propulsion device and which mounts a propeller-type speed sensor at the rear end thereof.

DETAILED DESCRIPTION OF THE PREFERRED EMBODIMENTS OF THE INVENTION

Figure 1:
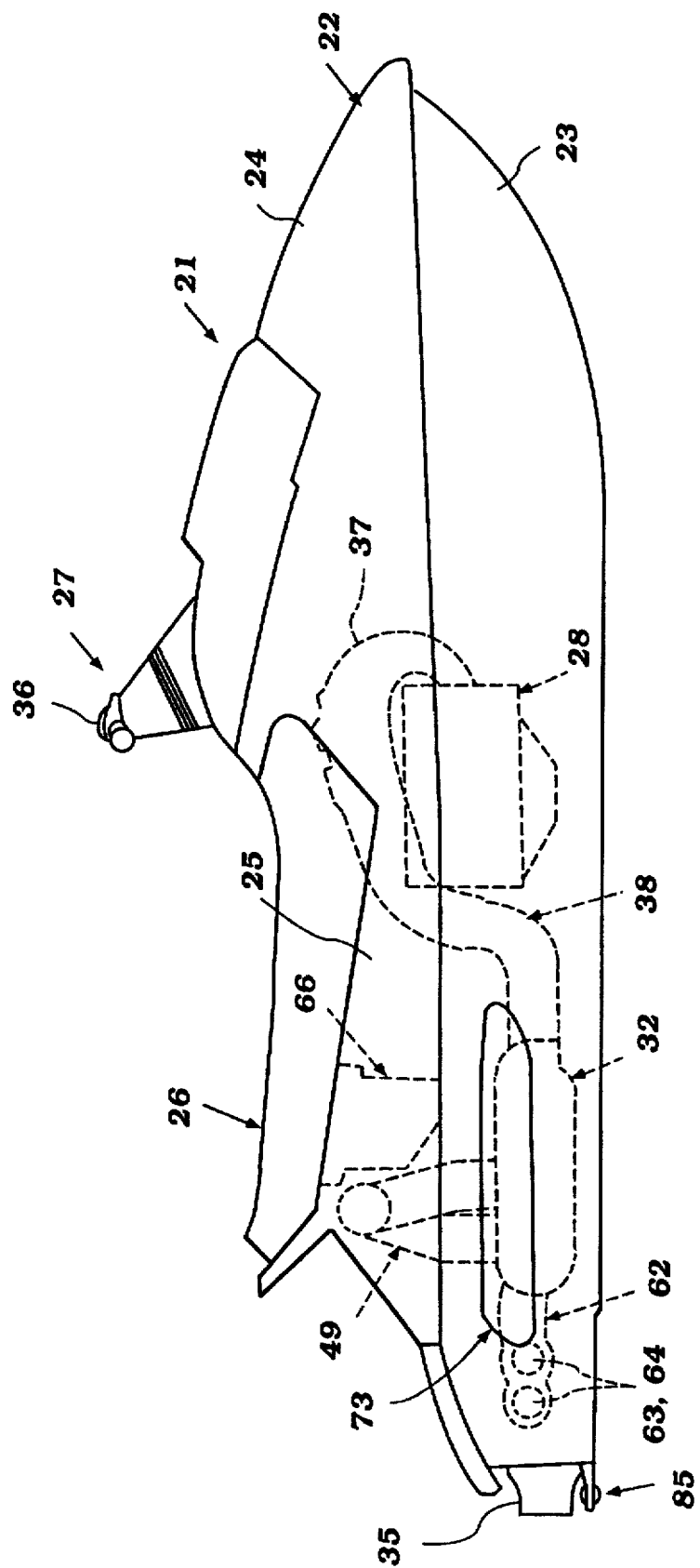
FIG. 1 is a side elevational view of a small watercraft constructed in accordance with an embodiment of the invention.
Figure 2:
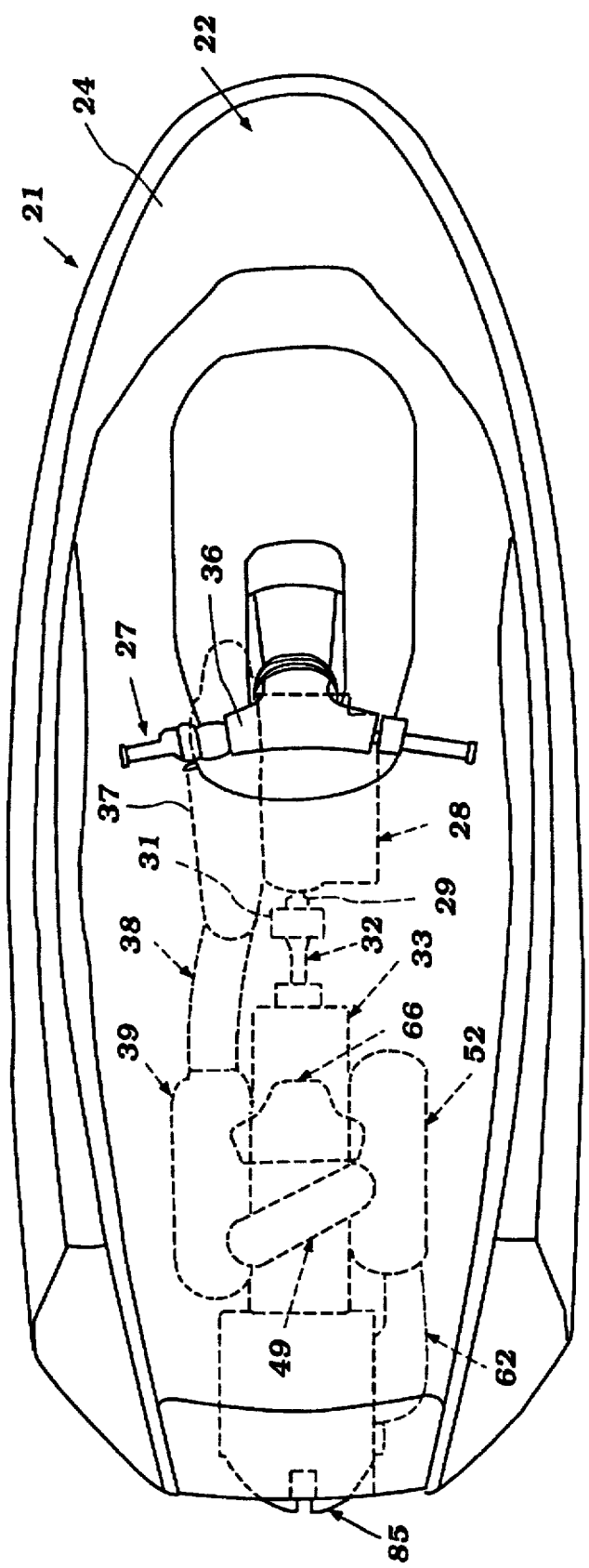
FIG. 2 is a top plan view of the watercraft.

Referring now in detail to the drawings and initially to FIGS. 1 and 2, a small personal watercraft constructed in accordance with an embodiment of the invention is identified generally by the reference numeral 21. The invention is described in conjunction with such a watercraft because it has particular utility therein. Of course, and as has already been noted, the invention, or at least certain facets of it, may be utilized with a wide variety of other types of watercraft and with personal watercraft having a different configuration than that illustrated.

The watercraft 21 is comprised of a hull assembly, indicated generally by the reference numeral 22, which is comprised of a lower hull portion 23 and a deck portion 24. The hull 22 portions may be formed from any suitable material, such as a molded fiberglass reinforced resin, or the like.

The area to the rear of the hull 22, and specifically the deck portion 24, is provided as a riders' area, and this includes a raised central pedestal 25 on which a seat 26 is provided. On the opposite sides of the raised portion 25, there are provided a pair of foot areas on which one or more riders seated in straddle fashion on the seat 26 may place their feet.

Forwardly of the riders' area, and specifically the seat 26, there is provided a control mast 27 which includes a handlebar assembly for controlling the propulsion unit of the watercraft, in a manner which will be described.

The area beneath the mast 27 and beneath the forward portion of the seat 26 and raised portion 25, forms an engine compartment. An internal combustion engine, shown schematically and indicated generally by the reference numeral 28, is provided in this engine compartment. The engine 28 may be of any known type utilized for this purpose. In the illustrated embodiment, the engine 28 is depicted as being an in-line, 3-cylinder type, 2-cycle crankcase compression engine. As noted previously, however, various other types of engines may be employed.

The engine 28 is mounted within the hull so that its output shaft 29 rotates about a longitudinally extending axis which is disposed generally on the longitudinal center line of the watercraft 21. This engine output shaft 29 is coupled by means of a flexible coupling 31 to an impeller shaft 32 of a jet propulsion unit, indicated generally by the reference numeral 33.

The jet propulsion unit 33 is mounted in a tunnel formed in the underside of the hull portion 23 at the rear end thereof. This tunnel is comprised of a pair of side walls, a forward bulkhead, which separates the tunnel from the engine compartment, and a top wall. Portions of these walls around the tunnel appear in other figures, and the tunnel forming wall members have been indicated by the reference numeral 34 in these figures. The jet propulsion unit 33, as is typical with this type of watercraft, has a downwardly facing water inlet portion that draws water from the body of water in which the watercraft 21 is operating. This water is drawn through the action of an impeller (not shown) that is coupled to the impeller shaft 32. The water is then discharged rearwardly through a discharge nozzle 35 which may be journaled for steering movement about a vertically extending axis. If this is the case, the steering of the discharge nozzle 35 is controlled by the control mast 27, and specifically by rotation of a handlebar assembly 36 thereof.

Since the actual construction of the jet propulsion unit and the propulsion system, except for its exhaust system, may be of any conventional type, these components have not been illustrated in any detail in the drawings. It will be readily apparent to those skilled in the art, however, how the invention may be utilized with any known type of propulsion unit or any other propulsion units.

The engine 28 is provided with an exhaust system which does embody certain features of the invention. This exhaust system includes an exhaust manifold 37 which is affixed to one side of the engine 28 and which cooperates with its exhaust ports so as to collect the exhaust gases discharged from them. This exhaust manifold 37 may be water-jacketed and receive water from the cooling jacket of the engine in a manner known in this art for cooling purposes. As may be seen, the exhaust manifold 37 extends forwardly in the hull, then curves upwardly and passes in part over the engine 28, and then downwardly to merge into an exhaust pipe 38.

The exhaust pipe 38 delivers the exhaust gases to one end of a first exhaust treatment device, indicated generally by the reference numeral 39, and which is disposed on one side of the tunnel 33. This exhaust treatment device 39 is comprised of a generally tubular outer housing 41 that is divided into a pair of internal chambers by means of a baffle 42. The exhaust pipe 38 cooperates with a curved inlet portion having a discharge end 43 that enters into the forwardmost chamber defined by the baffle 43 and in facing relationship to the side of this chamber. Hence, the exhaust gases are reflected off the internal wall in this chamber.

A plurality of tuning tubes 44 extend through the baffle 42 and communicate the forward chamber of the device 39 with the rearward chamber. The tubes 44 may be tuned to different lengths so as to provide a silencing function.

It will be seen that the exhaust treatment device 39 is supported on a buoyant mass of material 45 that is disposed in engagement with a V-shaped portion of the hull portion 23 on one side of the tunnel 34. A strap assembly 46 is engaged with fasteners 47 and 48 carried by the hull undersurface 23 and the upper portion of the tunnel forming wall 34 so as to hold the exhaust treatment device 39 in position.

A generally U-shaped transfer tube 49 cooperates with an inlet device 51 that extends into the rear portion of the rear expansion chamber of the exhaust treatment device 39. The end of the inlet portion 51 is disposed above the lower end of the chamber so as to provide a water trap effect.

A second exhaust treatment device, indicated generally by the reference numeral 52, is disposed on the opposite side of the tunnel 34. Like the treatment device 39, the treatment device 52 is comprised of a generally cylindrical outer shell 53 which defines an internal volume or expansion chamber 54.

It will be seen that the transfer tube 49 terminates in a discharge end 54 that extends into the expansion chamber 54 in a forward location. The end 55 is disposed forwardly of the inlet end 51. The end 55 also terminates above the lower wall of the chamber 54 so as to assist in providing a water trap function.

Like the exhaust treatment device 39, the device 52 is supported on a buoyant mass 56 and is held in place by straps 57. The straps 57 are connected to fasteners 58 affixed to the hull undersurface, and 59 affixed to the upper portion of the tunnel wall At the rear end of the exhaust treatment device 52, there is provided a discharge fitting 61 which also is disposed above the lower wall of the device 52 and which communicates with an exhaust pipe assembly 62. The exhaust pipe assembly 62 has a pair of branch outlets 63 and 64 which communicate with an enlarged portion 65 of the tunnel 34 formed at the rear of the jet propulsion unit 33. Hence, the exhaust gases will be delivered into the tunnel 34, and this will provide some silencing. The discharge ends 63 and 64 are disposed contiguous to the water level, but if they become submerged, the trap arrangement provided by the exhaust treatment devices 39 and 52 and the trap-shaped transfer tube 49 will ensure that this water cannot reach the engine through its exhaust system.

Figure 3:
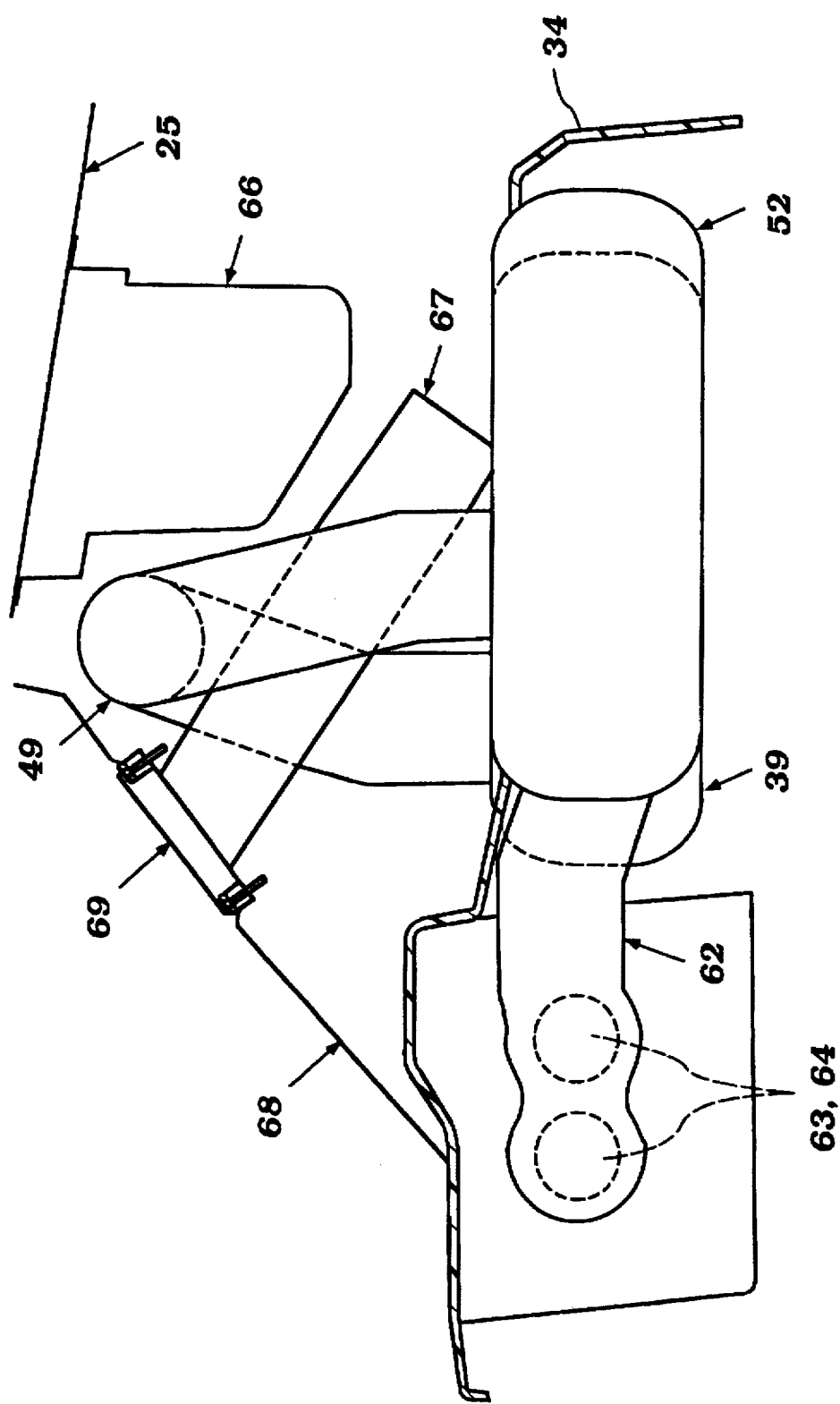
FIG. 3 is a partially broken-away view of the rear portion of the tunnel of the watercraft, and shows the relationship of the exhaust system to the storage compartments.
Figure 4:
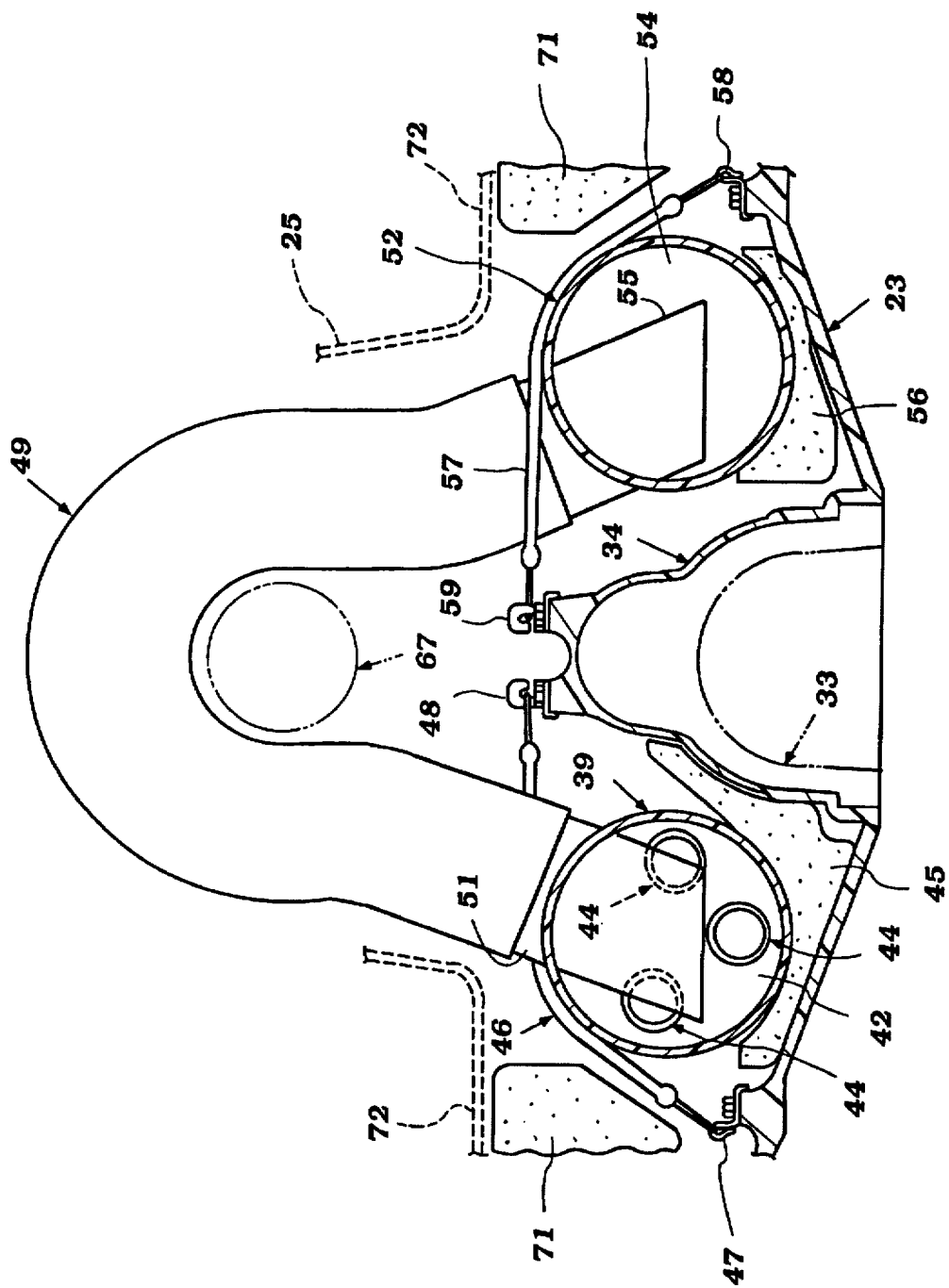
FIG. 4 is a cross-sectional view taken generally perpendicularly to the plane of FIG. 3 and shows the transfer tube.
Figure 5:
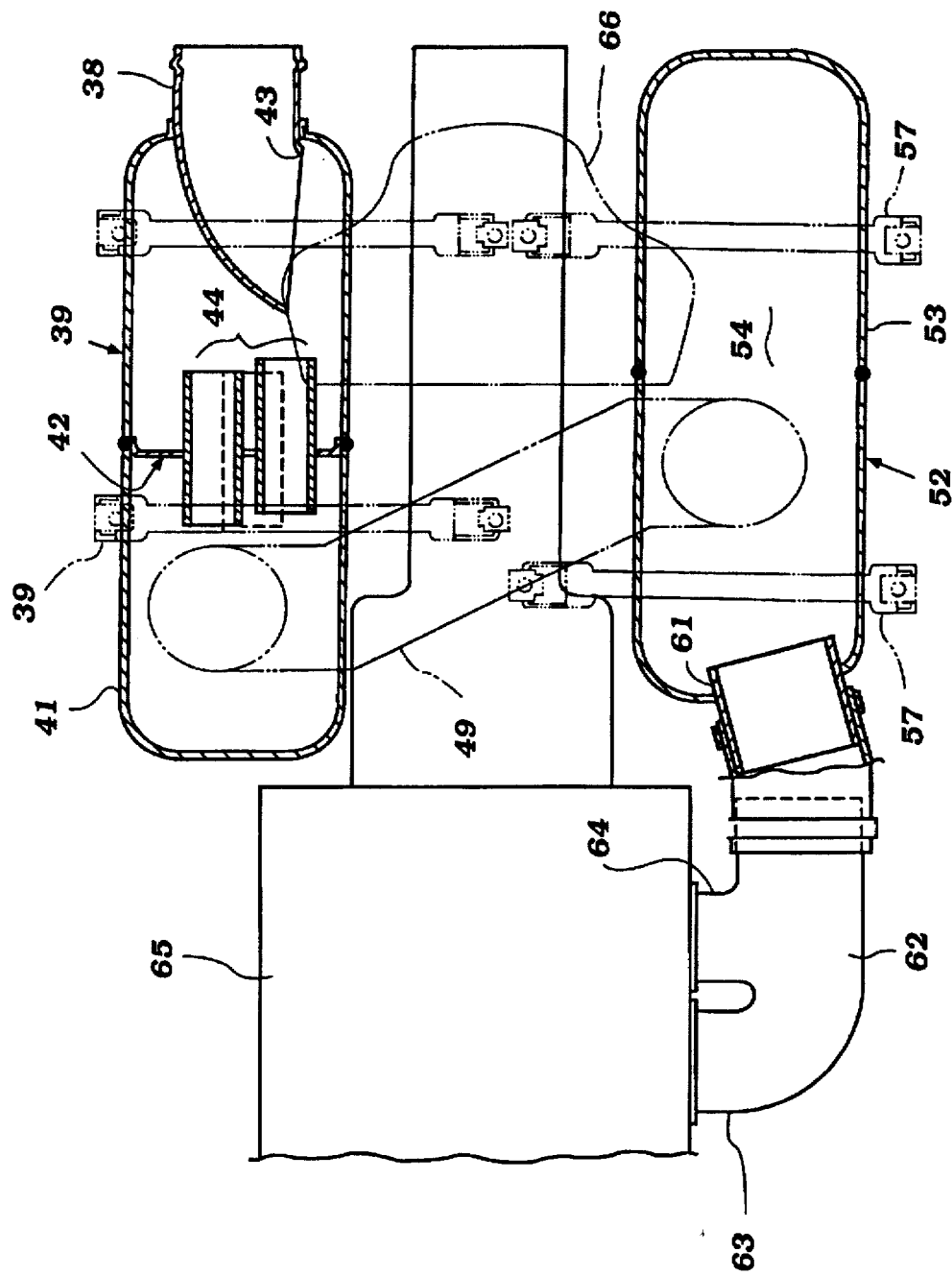
FIG. 5 is a top plan view of the portion of the exhaust system shown in FIGS. 3 and 4.
Figure 6:
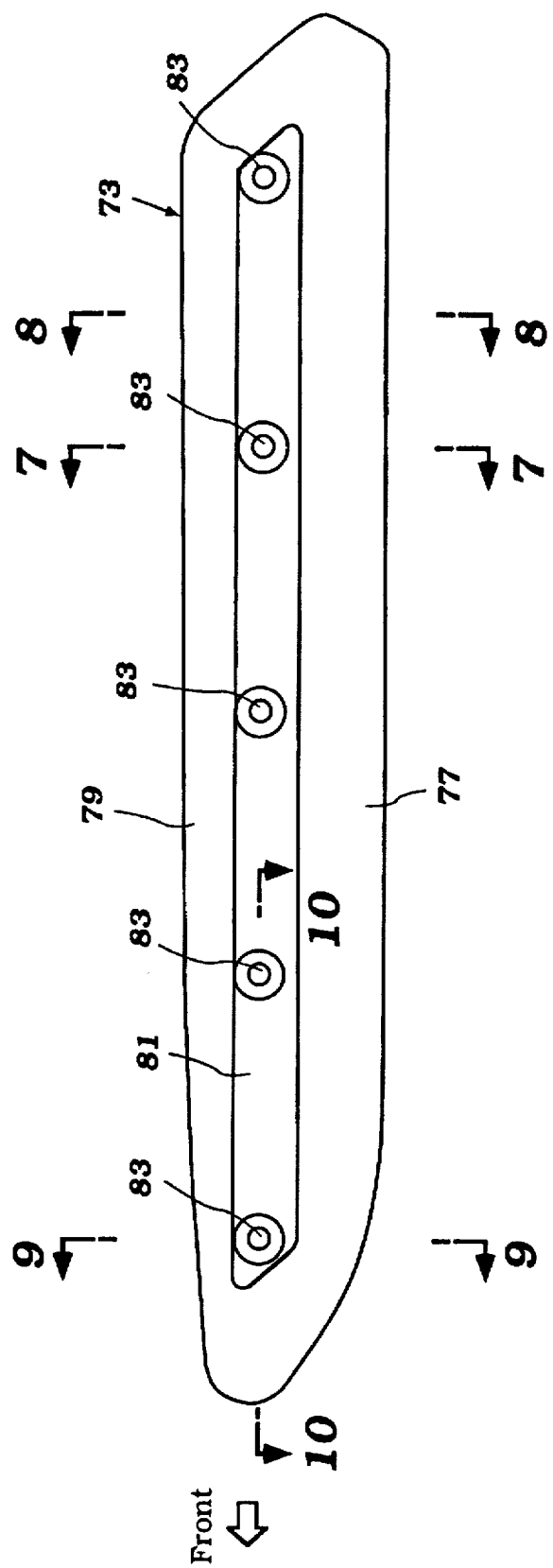
FIG. 6 is an enlarged side elevational view, taken from the side opposite to FIG. 1, and shows the sponson utilized in conjunction with the invention and mounted at the rear portion of the hull.

As best seen in FIGS. 2–3, the raised area 25 beneath the seat 26 is provided with a pair of storage areas. The first of these storage areas, indicated generally by the reference numeral 66, is accessible by removal of the seat 26 or a portion thereof. This device 66 is positioned forwardly of but contiguous to the transfer pipe 49, and thus does not interfere with it. Further, there is provided a second generally tubular storage bin 67 which opens through a rear face 68 of the raised portion 25 and which has a removable closure plug 69. A safety article, such as a fire extinguisher, may be placed in this storage compartment 67. As best seen in FIG. 6, it will be seen that this storage compartment 67 actually extends through the lower portion of the inverted U-shaped transfer pipe 49. Again, this provides a compact assembly.

In addition to the buoyant masses 45 and 46 that support the exhaust treatment devices 39 and 52, additional buoyant masses 71 may be formed on the opposite sides of the raised portion 25 beneath the foot areas 72 aforenoted that are disposed on the sides of the seat 26. This added buoyancy is desirable at the rear portion of the hull so that if riders in addition to the operator are seated, that the attitude of the watercraft 21 will not be adversely disturbed.

To further improve the handling of the hull and also to accommodate situations where extra riders may be accommodated, there are provided a pair of detachable sponsons, indicated generally by the reference numeral 73, on opposite sides of the hull, and specifically disposed so as to be substantially transversely outwardly of the hull surface 23. As has been previously noted, the hull undersurface 23 outside of the tunnel 34 has a generally V bottom. This configuration terminates in a pair of curved sections 74 that extend upwardly and outwardly to a reentrant portion 75 where they mate with vertically-extending walls 76 that form the outer peripheral edges of the hull.

Figure 7:
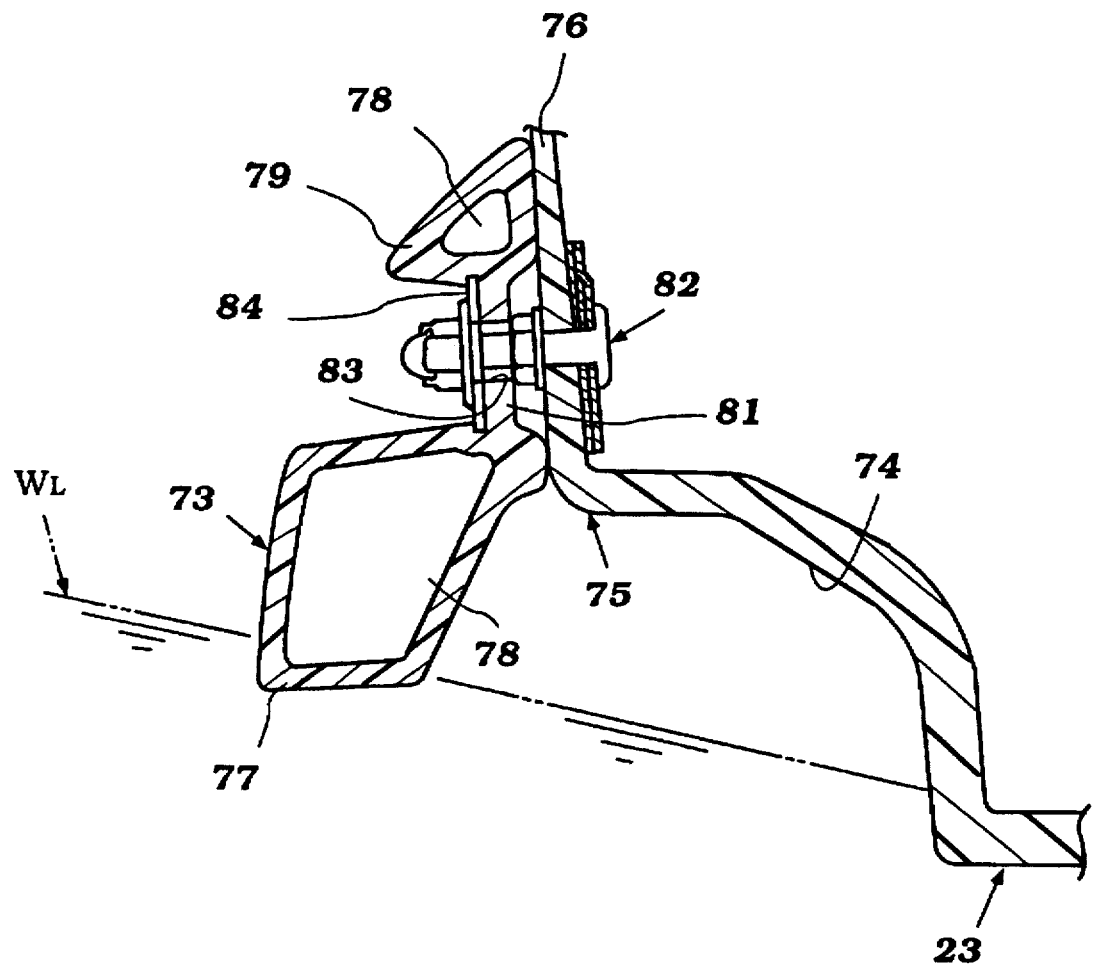
FIG. 7 is a cross-sectional view taken along the line 7—7 of FIG. 6.
Figure 8:
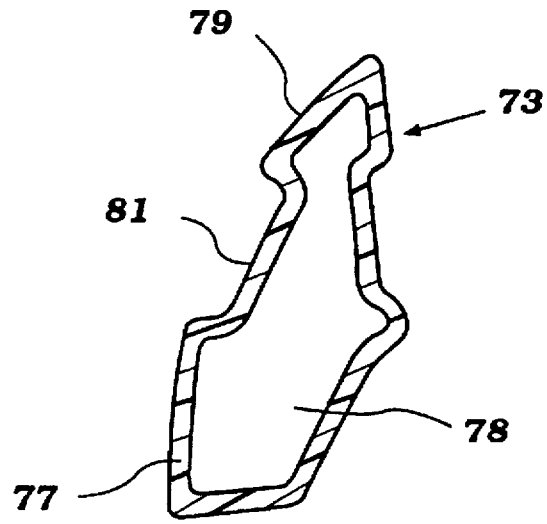
FIG. 8 is a cross-sectional view taken along the line 8—8 of FIG. 6.
Figure 9:
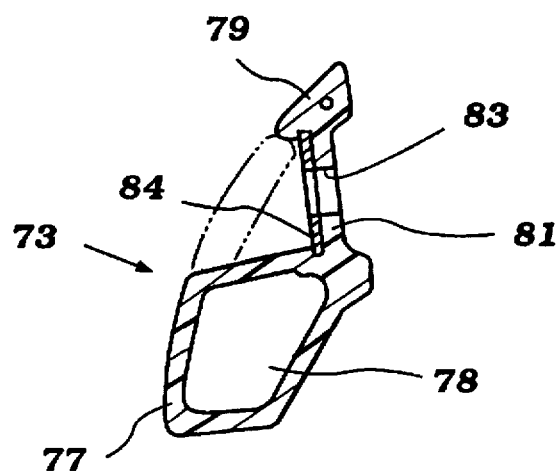
FIG. 9 is a cross-sectional view taken along the line 9—9 of FIG. 6.
Figure 10:
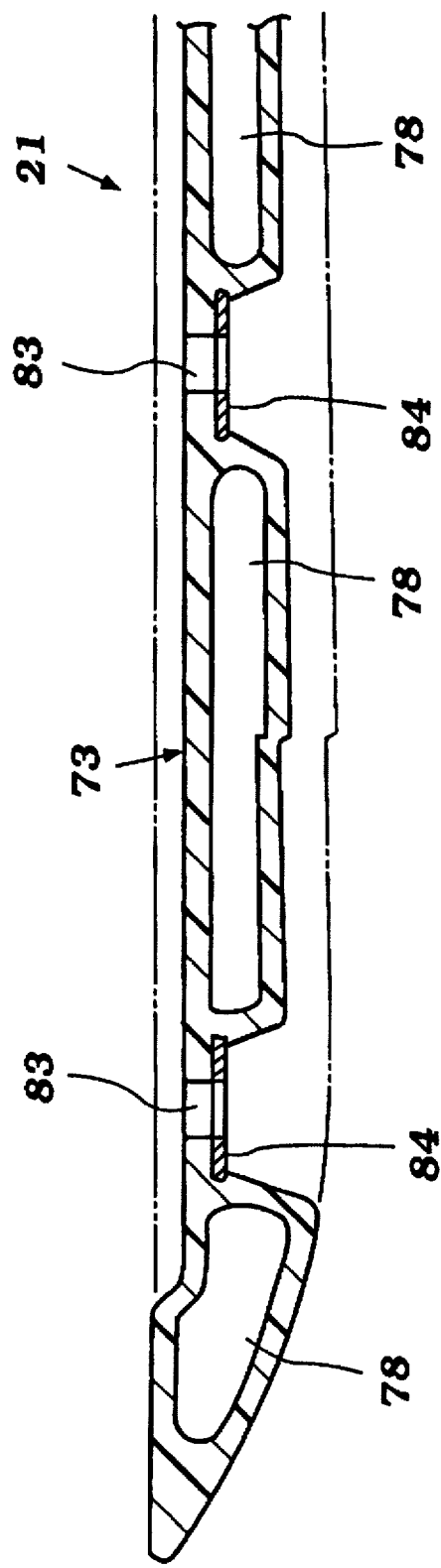
FIG. 10 is a cross-sectional view taken along the line 10—10 of FIG. 6.
Figure 11:
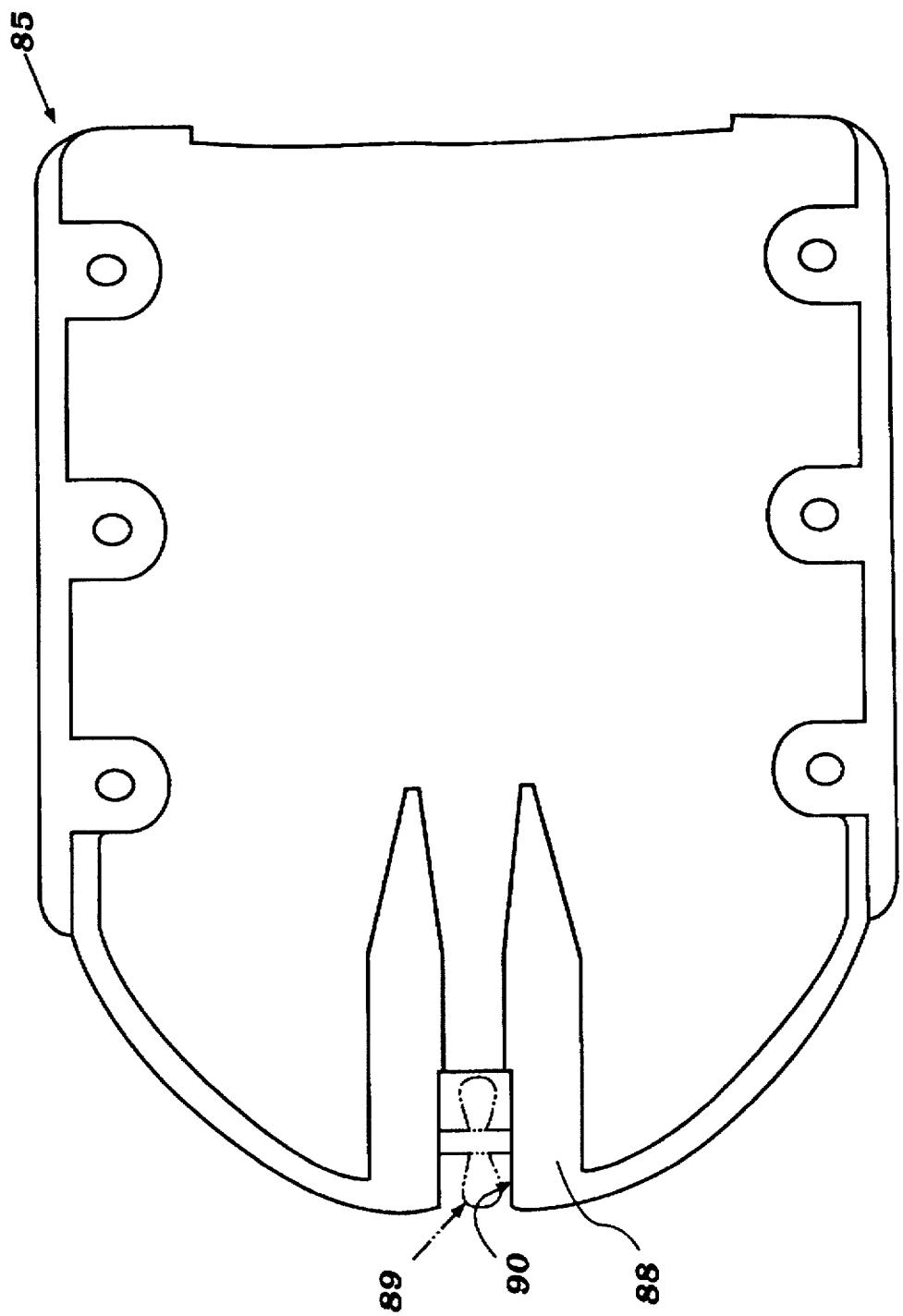
FIG. 11 is a bottom plan view showing the cover plate for the underside of the rear tunnel and the mounting arrangement for the speed sensor in accordance with an embodiment of the invention, the speed sensor and its mounting being shown in phantom in this view.

The sponsons 73 are formed from a relatively rigid molded material, which may be substantially the same as that of the hull portions 23 and 24. The sponsons 73 have a first depending portion 77 which are disposed so that they will be engaged with the water line WL as shown in FIG. 7, if the hull is leaned excessively. These portions 77 in effect form with the curved hull portion 74 a buoyant area that will assist in maintaining the hull from capsizing. In addition, these portions are hollow, as indicated at 78, so as to add further buoyancy upon leaning.

These buoyant portions 78 extend also to the upper peripheral edges 79 of the sponsons 73. The sponsons 73 are, however, provided with areas 81 that are configured and apertured as at 83 so as to receive fastener assemblies 82 so as to detachably affix the sponsons 73 to the side of the watercraft. Thus, if the rider wishes a more sporting fashion, he can detach the sponsons 73. However, for more stable running and to accommodate more weight, the sponsons 73 may be retained in position. Retainer plates 84 underlie the fasteners 82 to provide rigidity and spread the stress.

Figure 12:
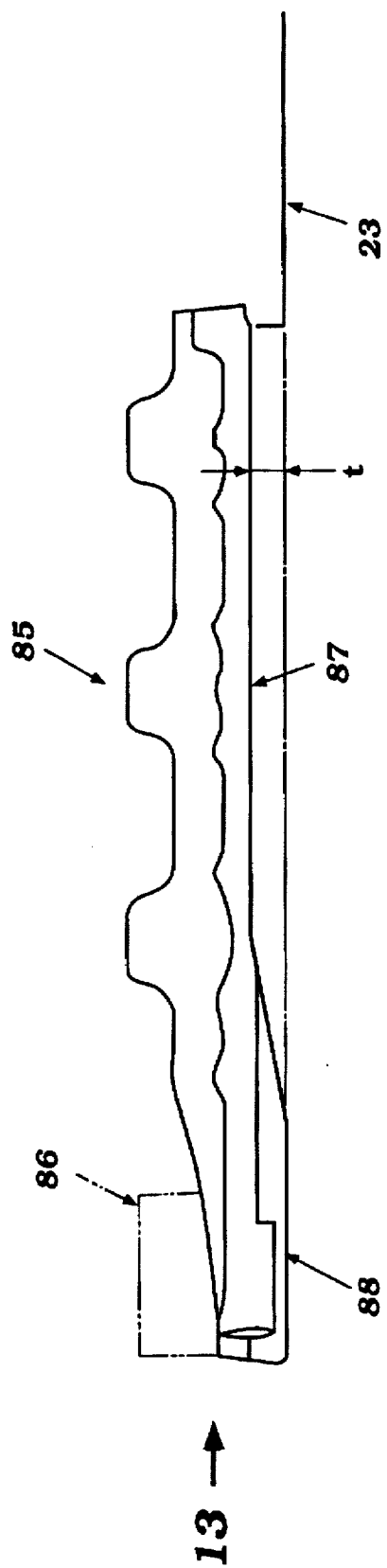
FIG. 12 is a side elevational view of this assembly, again showing the speed sensor and its mounting in phantom lines.
Figure 13:
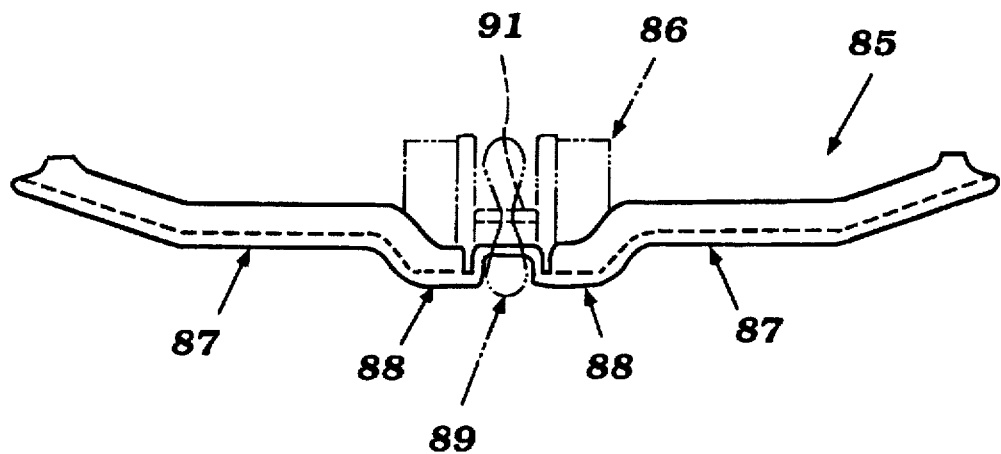
FIG. 13 is a rear elevational view looking generally in the direction of the arrow 13 in FIG. 12, and again showing the speed sensor and its mounting in phantom.
Figure 14:
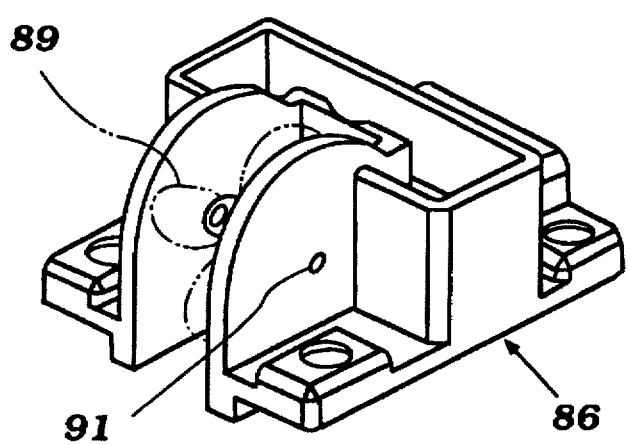
FIG. 14 is an enlarged perspective view showing the actual speed sensor arrangement, with portions again shown in phantom.

It has been noted that the tunnel 34 that houses the jet propulsion unit 33 generally is open through the lower portion of the hull. So as to improve the hull configuration and performance, there is provided an underplate assembly, indicated generally by the reference numeral 85 (FIGS. 11–14), which serves the dual purpose of closing the rear portion of the under hull and tunnel 34, supporting at least in part the jet propulsion unit 33 and forming a mounting for a speed sensor assembly, indicated generally by the reference numeral 86. The underplate 85 may be formed from any suitable material and has a generally planar lower surface 87 that extends to the rear of the hull undersurface 23 and has a downwardly extending portion 88 at its rear end so as to form a slight step at the rear of the hull to reduce the likelihood of porpoising without substantially increasing the length. This step has a depth indicated at "t" in FIG. 12.

The depending portions 88 are disposed transversely outwardly of an area where a propeller, indicated generally by the reference numeral 89 and shown in phantom in the figures of the speed sensor 86, depends. As a result of this construction, the propeller 89 will rotate about an axis 91 provided by a pivot pin mounted by the speed sensor 86 as the watercraft traverses the water in which it is operating. The rotational speed of the propeller 89 may be determined by a sensor mounted in the speed sensing device 86 and transmitted to a remote indicator (not shown).

It should be readily apparent from the foregoing description that the objects of the invention are well met by the described embodiment. Obviously, however, the embodiment which has been illustrated and described is only a preferred embodiment of the invention, and various changes and modifications may be made without departing from the spirit and scope of the invention, as defined by the appended claims.

What is claimed is:

1. A watercraft comprised of a hull with an undersurface defining a tunnel at the rear end thereof, a propulsion device positioned at least in part within said tunnel for propelling said watercraft, said hull further defining an engine compartment containing an engine for driving said propulsion device, said engine having an exhaust system for discharging exhaust gases from exhaust ports thereof to the atmosphere, said exhaust system comprising first and second exhaust treatment devices positioned within said hull on opposite sides of said tunnel, each of said exhaust treatment devices being comprised of an outer housing defining at least one expansion chamber therein, an exhaust pipe extending from said engine on one side of said hull and opening into said first exhaust treatment device at one longitudinal end thereof for delivering exhaust gases from said engine thereto, a generally inverted U-shaped transfer pipe extending over said tunnel from an inlet end at an upper portion of said first exhaust treatment device at the other longitudinal end thereof and terminating at a discharge end in an upper portion of said second exhaust treatment device at a position forwardly of the aft end of said second exhaust treatment device, and an exhaust discharge pipe extending from said aft end of said second exhaust treatment device for discharging exhaust gases to the atmosphere.

2. A watercraft as defined in claim 1, wherein the exhaust pipe discharges the exhaust gases into the tunnel.

3. A watercraft as defined in claim 2, wherein the exhaust pipe has a pair of longitudinally spaced discharge openings opening into the tunnel.

4. A watercraft as defined in claim 1, wherein the exhaust treatment devices have generally tubular configurations extending longitudinally of the hull.

5. A watercraft as defined in claim 4, wherein the exhaust treatment devices are affixed to the hull on opposite sides of the tunnel by at least one strap member.

6. A watercraft as defined in claim 5, wherein the exhaust treatment devices are supported within the hull on buoyant, resilient masses.

7. A watercraft as defined in claim 4, wherein at least one of the exhaust treatment devices is divided into two expansion chambers by a transversely extending baffle.

8. A watercraft as defined in claim 7, wherein tuning tubes extend through the baffle for communicating the expansion chambers defined thereby with each other.

9. A watercraft as defined in claim 8, wherein the inlet to the baffled exhaust treatment device is on one side of the baffle and the discharge therefrom is on the other side of the baffle.

10. A watercraft as defined in claim 9, wherein the baffled exhaust treatment device comprises the first exhaust treatment device.

11. A watercraft as defined in claim 1, wherein the hull defines a rider's area over the tunnel and defines a raised seat upon which a rider may be seated in straddle fashion which overlies the transfer pipe.

12. A watercraft as defined in claim 11, further including at least one storage compartment formed in the raised portion beneath the seat and juxtaposed to the transfer pipe.

13. A watercraft as defined in claim 12, wherein the storage compartment is disposed forwardly of the transfer pipe.

14. A watercraft as defined in claim 12, further including a second tubular-shaped storage compartment extending beneath and encircled by the transfer pipe.

15. A watercraft as defined in claim 12, wherein the storage compartment comprises a tubular storage member extending beneath and straddled by the transfer pipe.

16. A watercraft as defined in claim 1, further including a hull underplate affixed to the underside of the hull at the rear of the tunnel and carrying a speed sensor for providing a watercraft speed signal.

17. A watercraft as defined in claim 16, wherein the speed sensor is mounted at the rear of the underplate.

18. A watercraft as defined in claim 17, wherein the propulsion unit comprises a jet propulsion unit having a discharge nozzle, and the speed sensor is disposed beneath and forwardly of the discharge end of the discharge nozzle.

19. A watercraft as defined in claim 16, further including a pair of sponsons detachably affixed to the opposite sides of the hull.

20. A watercraft as defined in claim 19, wherein the area where the sponsons are affixed terminates in a lower V-bottom of the hull spaced inwardly from the sponsons, the sponsons being affixed to vertically upstanding walls of the hull connected to the V-shaped bottom by curved portions.

21. A watercraft as defined in claim 20, wherein the lower ends of the sponsons extend below the vertical wall and define air pockets for trapping water and increasing the buoyancy upon leaning of the hull.

22. A watercraft as defined in claim 21, wherein the lower portions of the sponsons are hollow to provide added buoyancy.

23. A watercraft comprised of a hull with an undersurface defining a tunnel at the rear end thereof, a jet propulsion unit positioned at least in part within said tunnel for propelling said watercraft, said jet propulsion unit having the discharge nozzle formed at the rear end thereof through which water is discharged for propelling said jet propulsion unit, a combined speed sensor and closure plate affixed to the underside of said hull and spanning the rear of said tunnel for closing said tunnel, said speed sensor and closure plate having a downwardly projection portion disposed beneath said discharge nozzle at the rear end thereof defining a gap and a propeller type speed sensor mounted at the rear end of said closure and speed sensor plate in said gap for providing a speed indicating signal.

24. A watercraft as defined in claim 23, wherein the hull undersurface is provided with a step contiguous to the forward edge of said combined speed sensor and closure plate.

25. A watercraft as defined in claim 24, wherein the rear end of the combined speed sensor and closure plate lies at the same level as the portion of the hull forwardly of the step so that the step is formed substantially completed by the combined speed sensor and closure plate.

26. A watercraft as defined in claim 25, wherein the speed sensor is mounted at the rear of the underplate.

27. A watercraft as defined in claim 26, wherein the propulsion unit comprises a jet propulsion unit having a discharge nozzle, and the speed sensor is disposed beneath and forwardly of the discharge end of the discharge nozzle.

* * * * *

UNITED STATES PATENT AND TRADEMARK OFFICE
CERTIFICATE OF CORRECTION

PATENT NO. : 5,699,749

DATED : December 23, 1997

INVENTOR(S) : Yamada, et. al.

It is certified that error appears in the above-identified patent and that said Letters Patent is hereby corrected as shown below:

Claim 1, line 21, please change "the" to --an--

Claim 4, line 3, please change "of" to --in--

Claim 9, line 1, please change "the" to --an--

Claim 9, line 3, please change "the discharge" to --a discharge--

Claim 11, line 2, please change "runnel" to --tunnel--

Claim 16, line 2, please change "underside" to --undersurface--

Claim 16, line 2, please change "the rear" to --a rear--

Claim 17, line 2, please change "the rear" to --a rear--

Claim 18, line 2, please change "unit comprises" to --device comprises--

Claim 18, line 4, please change "the discharge end" to --a discharge end--

Claim 19, line 2, please delete "the"

Claim 20, line 1, please change "the" to --an--

Claim 21, line 1, please delete "the"

Claim 22, line 1, please delete "the"

Claim 23, line 4, please change "the" to --a--

Claim 23, line 5, please change "the" to --a--

Claim 23, line 8, please change "the" to --a--

Claim 23, line 10, please change "projection" to --projecting--

Claim 23, line 11, please change "the" to --a--

Claim 24, line 2, please change "the" to --a--

UNITED STATES PATENT AND TRADEMARK OFFICE
CERTIFICATE OF CORRECTION

PATENT NO. : 5,699,749
DATED : December 23, 1997
INVENTOR(S) : Yamada, et. al.

It is certified that error appears in the above-identified patent and that said Letters Patent is hereby corrected as shown below:

Claim 25, line 3, please change "the same" to --a same--

Claim 25, line 3, please change "the portion" to --a portion--

Claim 25, line 4, please change "completed" to --completely--

Claim 26, line 2, please change "underplate" to --closure plate--

Signed and Sealed this

Twenty-second Day of May, 2001

Attest:

NICHOLAS P. GODICI

*Attesting Officer*    *Acting Director of the United States Patent and Trademark Office*